United States Patent [19]

Axelrod

[11] Patent Number: 5,223,563
[45] Date of Patent: Jun. 29, 1993

[54] ANTISTATIC PPE COMPOSITIONS AND METHODS

[75] Inventor: Robert J. Axelrod, Orefield, Pa.

[73] Assignee: General Electric Company, Pittsfield, Mass.

[21] Appl. No.: 424,641

[22] Filed: Oct. 20, 1989

[51] Int. Cl.$^5$ ............................................... C08K 3/16
[52] U.S. Cl. ........................... 524/401; 524/508; 524/910
[58] Field of Search ................. 524/910, 508, 401

[56] References Cited

U.S. PATENT DOCUMENTS

| | | | |
|---|---|---|---|
| 3,224,889 | 12/1965 | Schülde | 106/177 |
| 3,395,137 | 7/1968 | Reindl | 524/128 |
| 3,425,981 | 2/1969 | Puletti | 524/586 |
| 3,450,794 | 6/1969 | Ebneth et al. | 525/86 |
| 4,123,475 | 10/1978 | Abolins et al. | 260/874 |
| 4,315,081 | 2/1982 | Kobayashi et al. | 524/141 |
| 4,543,390 | 9/1985 | Tanaka et al. | 525/63 |
| 4,588,773 | 5/1986 | Federl et al. | 525/64 |
| 4,687,801 | 8/1987 | Mitani et al. | 524/104 |
| 4,719,263 | 1/1988 | Barnhouse et al. | 525/187 |
| 4,775,716 | 10/1988 | Kipouras et al. | 525/64 |
| 4,857,590 | 8/1989 | Gaggar et al. | 525/64 |

Primary Examiner—Paul R. Michl
Assistant Examiner—John J. Guarriello

[57] ABSTRACT

Thermoplastic polymer compositions comprise a polyphenylene ether resin, s styrene resin and a hygroscopic salt in an amount sufficient to provide the compositions with antistatic properties. Preferably, the hygroscopic salt comprises lithium chloride and is included in an amount of from about 0.5 to about 5 parts by weight per hundred parts by weight resins.

12 Claims, No Drawings

ANTISTATIC PPE COMPOSITIONS AND METHODS

FIELD OF THE INVENTION

The present invention relates to polyphenylene ether resin compositions which exhibit antistatic properties. The present invention also relates to methods for providing polyphenylene ether resin compositions with antistatic properties. Throughout the present disclosure, reference to antistatic properties refers to the ability of a material to dissipate electrostatic charge.

BACKGROUND OF THE INVENTION

Thermoplastic polymer compositions which are electrically insulating tend to accumulate very high electrostatic potentials via triboelectric generation and therefore are disadvantageous for use in many applications. For example, when such compositions are employed in electronic equipment, the static electric charge can accumulate and permanently damage sensitive integrated circuits if one or more parts formed of the electrically insulating polymer compositions are grounded through the integrated circuits.

Accordingly, resin compositions which exhibit antistatic properties and dissipate electrostatic charge are advantageous for use in various applications in the electronics industry including devices employing integrated circuit components, housings for computer components and other electrical equipment, smoke detectors which employ electrically polarized ionization chambers, and the like. Antistatic resins have been prepared by including one or more antistatic additives in the resin compositions. Generally, these additives are derivatives of quaternary ammonium salts and contain thermally unstable, hygroscopic functionalities such as polyethylene oxide radicals. The use of the hygroscopic groups is based on the theory that the antistatic effect is provided by a conductive surface layer on the resin which is formed from a water solution of organic ions. Resins having antistatic properties generally exhibit a static decay time of less than two seconds as required by Military Specification MIL-B-81705B when measured by Federal Test Method 4046, Standard 101B, employing an ETS Static Decay Meter, Model SDM 406B.

Generally, however, it has been difficult to provide antistatic properties to high performance engineering resins such as polyphenylene ether resin compositions since such resins are processed at relatively high temperatures which degrade conventional antistatic additives.

SUMMARY OF THE INVENTION

Accordingly, it is an object of the present invention to provide thermoplastic polymer compositions which exhibit antistatic properties. It is a further object of the invention to provide high performance polyphenylene ether resin compositions which exhibit antistatic properties. It is an additional object of the invention to provide such compositions which exhibit such antistatic properties after repeated water washings. It is a further object of the invention to provide antistatic polyphenylene ether resin compositions which also exhibit environmental stress crack resistance. A further object of the present invention is to provide methods for rendering thermoplastic polymer compositions comprising polyphenylene ether resins antistatic.

These and additional objects are provided by the thermoplastic polymer compositions of the present invention which comprise a polyphenylene ether resin, a styrene resin and a hygroscopic salt. The hygroscopic salt is included in an amount sufficient to provide the composition with antistatic properties. In a preferred embodiment, the hygroscopic salt comprises lithium chloride. The compositions according to the present invention exhibit good antistatic properties, even after repeated water washings, and environmental stress crack resistance.

These and additional objects and advantages provided by the compositions and methods of the present invention will be more fully understood in view of the following detailed description.

DETAILED DESCRIPTION

The present thermoplastic polymer compositions comprise a polyphenylene ether resin, a styrene resin and a hygroscopic salt in an amount sufficient to provide the composition with antistatic properties.

Polyphenylene ether resins adapted for use in the polymer compositions of the present invention comprise polymers and copolymers having repeating structural units of the following general formula:

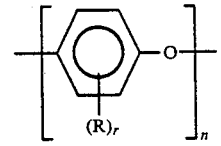

wherein each R individually represents a monovalent substituent such as hydrogen, halogen, alkyl, aryl, alkoxy and other hydrocarbon groups, r is from 1 to 4 and n represents the degree of polymerization. Preferably, n is at least 20, and more preferably, n is at least 50.

The polyphenylene ether resins suitable for use in the polymer compositions of the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875 and in the Stamatoff U.S. Pat. Nos. 3,257,357 and 3,257,358, all of which are incorporated herein by reference. Throughout the Specification and Claims the term "polyphenylene ether" includes unsubstituted polyphenylene ether polymers, substituted polyphenylene ether polymers and polyphenylene ether copolymers.

Preferred polyphenylene ether resins adapted for use in the polymer compositions of the present invention include, but are not limited to, poly(2,6-dimethyl-1,4-phenylene)ether; poly(2,3,6-trimethyl-1,4-phenylene) ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; copolymers thereof, and the like. Particularly preferred polyphenylene ether resins for use in the compositions of the present invention include poly(2,6-dimethyl-1,4-phenylene) ether and copolymers including units of 2,3,6-trimethyl-1,4-phenylene ether and units of 2,6-dimethyl-1,4-phenylene ether. Examples of such polymers and copolymers are set forth in U.S. Pat. No. 4,806,297.

The thermoplastic polymer compositions further include a styrene resin. Various styrenes resins are well known in the art and preferably comprise at least 25 weight percent polymer units derived from a styrene monomer having the following formula:

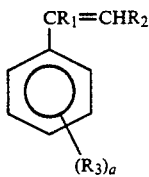

wherein $R_1$ and $R_2$ are selected from the group consisting of lower alkyl or alkenyl groups of from, for example, 1 to 6 carbon atoms and hydrogen, each $R_3$ is selected from the group consisting of halogen, hydrogen and lower alkyl or alkenyl groups of from, for example, 1 to 6 carbon atoms, and a is an integer of from 0 to 5. Throughout the specification and claims the term "polystyrene resin" includes unsubstituted polystyrene, substituted polystyrene and polystyrene copolymer resins. For example, suitable polystyrene resins include, but are not limited to, homopolymers of polystyrene, polychlorostyrene, polymethylstyrene and the like, and styrene-containing copolymers such as styrene-acrylonitrile copolymers, copolymers of ethyl vinyl benzene and divinyl benzene, styrene-acrylonitrile-methylstyrene terpolymers, styrene-halogenated styrene copolymers and the like. The methods for preparing these polystyrenes are well known in the art.

In a preferred embodiment, the styrene resin is a high impact polystyrene resin which comprises a polystyrene resin and an impact modifier. The impact modifier included in the high impact polystyrene resins serves to improve the impact properties of the polymer compositions. Impact modifiers are well known in the art and generally comprise rubber or elastomeric compounds. Both natural and synthetic rubber and elastomeric compounds are suitable for use in the high impact polystyrene resins. For example, suitable impact modifiers include homopolymers or copolymers of one or more monomers such as butadiene, isoprene and ethylene-propylene diene monomers. Additional impact modifiers for use in the present invention include, but are not limited to, hydroxy- and carboxy-terminated polybutadienes, polychlorobutadienes, copolymers of dienes such as butadiene and isoprene with various comonomers such as alkyl unsaturated esters, for example methylmethacrylate, unsaturated ketones, for example methylisopropenyl ketone, vinyl heterocyclics, for example vinyl pyridine, and the like. Other impact modifiers known in the art may also be used according to the present invention. Preferably, the impact modifier and the polystyrene resin which are combined to form the high impact polystyrene resin are combined prior to mixing with the other composition ingredients. Additionally, the polystyrene resin and the impact modifier are preferably combined in a ratio of at least 3:1 by weight to form the high impact polystyrene resin which is then blended with the polyphenylene ether and the remaining composition ingredients.

It is preferred that the polyphenylene ether resin is included in the present compositions in an amount of from about 10 to about 90 parts by weight, more preferably about 20 to about 80 parts by weight, and that the styrene resin is included in an amount of from about 10 to about 90 parts by weight, preferably from about 20 to about 80 parts by weight, per 100 parts by weight polyphenylene ether resin and styrene resin combined.

The hygroscopic salt which is included in the thermoplastic polymer compositions of the present invention is employed in an amount sufficient to provide the compositions with antistatic properties. A hygroscopic salt generally has the ability to absorb moisture from air. Generally, the inclusion of from about 0.5 to about 5 parts by weight of the hygroscope salt per 100 parts by weight resins provides the composition with antistatic properties characterized by static decay times of less than two seconds using Federal Test Method 4046, Standard 101B, as required by Military Specification MIL-B-81705B. It is preferred that the hygroscopic salt comprises lithium chloride, although other hygroscopic salts, for example calcium chloride and zinc chloride may be employed alone or in combination with the lithium chloride. It is believed that the thermal stability and the hydroscopic property of the lithium chloride assist in imparting the antistatic properties to the present compositions. As will be exhibited in the examples set forth below, the antistatic properties of the present polymer compositions are retained, even after repeated water washings. Additionally, it has been discovered that the lithium chloride also provides the resulting thermoplastic polymer compositions with improved environmental stress crack resistance.

The thermoplastic polymer compositions may also include conventional ingredients known in the art. For example, the compositions may include an additional impact modifier in order to further improve the impact strength of the compositions. Impact modifiers for polyphenylene ether resin compositions are well known in the art and include, but are not limited to, the following: natural rubber, butadiene polymers, butadiene/styrene copolymers, isoprene polymers, chlorobutadiene polymers, butadiene/acrylonitrile copolymers, isobutylene polymers, isobutylene/butadiene copolymers, isobutylene/isoprene copolymers, acrylic ester polymers, ethylene/propylene copolymers, ethylene/propylene/diene copolymers, thiokol rubber, polysulfide rubber, polyurethane rubber, polyether rubber (e.g., polypropylene oxide), epichlorohydric rubber, hydrogenated or non-hydrogenated block copolymers of the A-B-A and A-B type wherein A is polystyrene and B is an elastomeric diene, e.g., polybutadiene, radial teleblock copolymers of styrene and a conjugated diene, acrylic resin modified styrene-butadiene resins, thermoplastic polyester elastomers, thermoplastic polyether-ester elastomers, ethylenic ionomer resins, and the like. The impact modifier, if included, is different from the styrene resin included in the compositions of the invention. Preferably, such impact modifiers are included in an amount of from about 1 to about 30 parts by weight, per 100 parts by weight total resins.

Additionally, conventional amounts of conventional additives for processability, stability and the like, including color stabilizers, thermal stabilizers, fire retardants and the like, may be included in the polymer compositions of the present invention. Fillers and/or reinforcing fillers may also be included in the compositions in a conventional manner.

The compositions of the present invention including the hygroscopic salt exhibit improved antistatic properties which are retained even after repeated washings with water, even in an ultrasonic bath. The antistatic properties are particularly desirable when injection molding the polymer compositions whereby the resulting injection molded parts may be used in various applications in the electronics industry.

The following examples are provided to illustrate specific embodiments of the present invention.

EXAMPLE 1

In this example, polyphenylene ether resin Compositions 1-8 were prepared, Compositions 1-7 being according to the present invention and Composition 8 being a comparative composition. Each composition contained 50 parts by weight polyphenylene ether resin, 50 parts by weight high impact polystyrene, 15 parts by weight of a trialkaryl phosphate flame retardant, 1.5 parts by weight polyethylene, 0.5 parts by weight of a phosphite color stabilizer and 0.15 parts by weight each of zinc oxide and zinc sulfide. Compositions 1-7 according to the present invention also contained lithium chloride. The amount of lithium chloride included in each of Compositions 1-7 is set forth in Table I. Comparative Composition 8 did not contain any lithium chloride. The compositions were molded at 500°/150° F. of with a melt temperature of approximately 530° F. to provide samples for testing. Samples of each of Compositions 1-8 were subjected to measurement of melt viscosity (540° F., 1500 sec$^{-1}$) according to ASTM D-3835-79, heat distortion temperature (2.5×0.5×⅛-inch bars) according to ASTM D-648, Izod impact (2.5×0.5×⅛-inch bar) according to ASTM D-256, and tensile properties (=-inch tensile bars) according to ASTM D-638. The compositions were also subjected to measurement of their mold filling capabilities using a flow channel test employing a ¼-inch channel and an injection molding temperature of approximately 530° F. The results of these measurements are set forth in Table I.

EXAMPLE 2

A further Composition 9 according to the present invention was prepared comprising 20 parts by weight polyphenylene ether resin, 80 parts by weight styrene-dibromostyrene copolymer, 1.5 parts by weight polyethylene, 5 parts by weight antimony oxide and 0.15 parts by weight each of zinc oxide and zinc sulfide. Composition 9 also included 1.5 parts by weight lithium chloride. This composition was molded and subjected to measurement in accordance with the procedures described in Example 1. The composition exhibited a melt viscosity of 1276 poise, a flow channel of 21.5 inches, a heat distortion temperature of 216° F., an Izod impact of 2.0 ft. lb./in., a tensile yield of 6.6×10³ psi, a tensile strength of 6.6×10³ psi and a tensile elongation of 47 percent.

EXAMPLE 3

Molded samples of Compositions 1-9 were subjected to several tests to evaluate their antistatic properties. Using Federal Test Method 4046, Standard 101B, and employing an ETS Static Decay Meter, Model SDM 406B, the static decay properties of the samples were determined. During each test, 5,000 volts were employed and the respective sample was shorted to ground. The tests were conducted under conditions of 15% or lower relative humidity. Directly after molding, samples of each composition were placed in airtight plastic bags and were not exposed to ambient air or humidity. None of the compositions exhibited charge decay, presumably owing to lack of moisture pickup under the anhydrous storage and test conditions. Similar samples of the compositions were allowed to sit for 48 hours at room temperature and humidity (approximately 50-60% relative humidity). The samples were then tested for residual charge, acceptance of full charge and decay rate (time to decay to 10 percent of original charge). The results of these tests are set forth in Table II.

TABLE II

| Composition | LiCl | Residual Charge | Accepted Full Charge | Decay Rate, sec. |
|---|---|---|---|---|
| 1 | 0.1 | Yes | No | ∞ |
| 2 | 0.3 | Yes | No | ∞ |
| 3 | 0.5 | Yes | No | ∞ |
| 4 | 1.0 | No | Yes | .05 |

TABLE I

| | Composition | | | | | | | |
|---|---|---|---|---|---|---|---|---|
| | 1 | 2 | 3 | 4 | 5 | 6 | 7 | 8 |
| LiCl, parts by weight | 0.1 | 0.3 | 0.5 | 1.0 | 1.5 | 2.0 | 3.0 | — |
| Melt Viscosity, Poise | 997 | 996 | 1010 | 1012 | 1054 | 1046 | 1109 | 1135 |
| Flow Channel, inches | 21 | 20.5 | 20.5 | 21 | 20.5 | 20.5 | 20 | 20 |
| Heat Distortion Temp., °F. | 186 | 186 | 187 | 187 | 186 | 186 | 189 | 186 |
| Izod Impact, ft-lb/in. | 4.6 | 4.2 | 3.7 | 2.8 | 2.5 | 2.2 | 1.8 | 5.2 |
| Tensile Yield, psi | 7.9 | 7.9 | 7.9 | 7.9 | 7.9 | 7.7 | 7.9 | 8.0 |
| Tensile Strength, psi | 7.1 | 7.1 | 7.0 | 7.0 | 5.8 | 6.9 | 7.0 | 7.4 |
| Elongation, % | 71 | 59 | 56 | 46 | 47 | 55 | 46 | 87 |

The results set forth in Table I demonstrate that the polymer compositions according to the present invention exhibit a good combination of physical properties. While the addition of lithium chloride appears to decrease the Izod impact of the compositions, this property can be improved by the use of thermoplastic elastomer impact modifiers and/or by reducing the particle size of the lithium chloride included therein.

| 5 | 1.5 | No | Yes | .05 |
| 6 | 2.0 | No | Yes | .05 |
| 7 | 3.0 | No | Yes | .05 |
| 8 | — | Yes | No | ∞ |
| 9 | 1.5 | No | Yes | .05 |

Additional molded samples were washed with water, dried with a cloth and then subjected to the above-described test procedures. The results of these tests are set forth in Table III.

TABLE III

| Composition | LiCl | Residual Charge | Accepted Full Charge | Decay Rate, sec. |
|---|---|---|---|---|
| 1 | 0.1 | Yes | No | ∞ |
| 2 | 0.3 | Yes | No | ∞ |
| 3 | 0.5 | Yes | No | ∞ |
| 4 | 1.0 | Yes | No | ∞ |
| 5 | 1.5 | Slight | Yes | .05 to residual charge |
| 6 | 2.0 | No | Yes | .21 |
| 7 | 3.0 | No | Yes | .05 |
| 8 | — | Yes | No | ∞ |
| 9 | 1.5 | Slight | No | ∞ |

Finally, the samples were subjected to washing in a dishwasher. The washed samples were wiped clean and dried and then again tested according to the above-described procedures. The results of these tests are set forth in Table IV.

TABLE IV

| Composition | LiCl | Residual Charge | Accepted Full Charge | Decay Rate, sec. |
|---|---|---|---|---|
| 1 | 0.1 | Yes | No | ∞ |
| 2 | 0.3 | Yes | No | ∞ |
| 3 | 0.5 | Slight (8%) | No | ∞ |
| 4 | 1.0 | No | Yes | .25 |
| 5 | 1.5 | No | Yes | .05 |
| 6 | 2.0 | No | Yes | .04 |
| 7 | 3.0 | No | Yes | .05 |
| 8 | — | Yes | No | ∞ |
| 9 | 1.5 | No | Yes | .05 |

The test results set forth above demonstrate that between 0.5 and 1.0 parts by weight of lithium chloride per 100 parts by weight resin was required in order for the compositions to exhibit static dissipation. The above test results also demonstrate that the antistatic properties are retained, even after washing, when at least about 1 part by weight of lithium chloride is employed per 100 parts by weight resin. Additionally, sufficient lithium chloride was retained after vigorous washing to maintain the antistatic properties.

Generally, conditioning the as molded samples for approximately two hours at 15 percent relative humidity prior to conducting the described tests was sufficient to hydrate the samples whereby the antistatic properties could be determined.

EXAMPLE 4

Polymer Compositions 11 and 12 were prepared generally as described in Example 1 containing 1 part by weight lithium chloride and 3 parts by weight lithium chloride, respectively, per 100 parts by weight polyphenylene and high impact polystyrene resins. The environmental stress crack resistance of the compositions was then determined according to the following procedure. Molded samples were formed in a relatively cold mold in order to simulate high levels of environmental stress. The samples were then positioned in a strain jig in which a portion of the sample was bent around a curved portion of the jig. A stress relaxer comprising the liquid trialkaryl phosphate flame retardant was painted on the bent sample and the sample was then maintained in the strain jig for a period of time T. For each period of time T, five samples of each of Compositions 11 and 12 were tested. Afterward, each sample was examined to determine if cracks occurred in the tested sample. Samples of Comparative Composition 8 described in Example 1 and containing no lithium chloride were also tested. The results of these tests are set forth in Table V. In Table V, the percent cracked value refers to the percentage of the five samples tested, whereby 20 percent indicates that one of the five samples cracked, 40 percent indicates that two of the five samples cracked, etc.

TABLE V

| T, Hours | Composition 8 (no LiCl), % cracked | Composition 11 (1% LiCl), % cracked | Composition 12 (3% LiCl), % cracked |
|---|---|---|---|
| 0 | 0 | 0 | 0 |
| 0.5 | 0 | 20 | 0 |
| 1 | 40 | 20 | 0 |
| 3 | 60 | 100 | 0 |
| 6 | 80 | 100 | 0 |
| 23 | 100 | 100 | 0 |
| 30 | 100 | 100 | 0 |
| 46 | 100 | 100 | 0 |

These results demonstrate that the addition of small amounts, for example 3 weight percent, of lithium chloride to polyphenylene ether resin compositions also provides an improved effect on the resins' environmental stress crack resistance.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. An antistatic thermoplastic polymer composition, comprising a polyphenylene ether resin, a styrene resin and an antistatic agent consisting essentially of lithium chloride in an amount sufficient to provide the composition with a static decay time of less than two seconds according to Federal Test Method 4046, Standard 101B, the static decay time being the time required for a charge applied to the composition to decay to 10 percent of its original value.

2. A method for providing a thermoplastic polymer composition comprising a polyphenylene ether resin and a styrene resin with antistatic properties, said method comprising adding to the composition an antistatic agent consisting essentially of lithium chloride in an amount sufficient to provide the composition with a static decay time of less than two seconds according to Federal Test Method 4046, Standard 101B, the static decay time being the time required for a charge applied to the composition to decay to 10 percent of its original value.

3. A thermoplastic polymer composition as defined by claim 1, wherein the polyphenylene ether resin comprises poly(2,6-dimethyl-1,4-phenylene) ether.

4. A thermoplastic polymer composition as defined by claim 1, wherein the polyphenylene ether resin comprises a copolymer including units of 2,6-dimethyl-1,4-phenylene ether and units of 2,3,6-trimethyl-1,4-phenylene ether.

5. A thermoplastic polymer composition as defined by claim 1, comprising from about 0.5 to about 5 parts by weight of lithium chloride per hundred parts by weight resins.

6. A thermoplastic polymer composition as defined by claim 1, wherein the styrene resin is a high impact polystyrene resin which comprises a polystyrene resin and an impact modifier.

7. A thermoplastic polymer composition as defined by claim 1, comprising from about 10 to about 90 parts by weight of the polyphenylene ether resin and from about 10 to about 90 parts by weight of the styrene resin, per 100 parts by weight polyphenylene ether resin and styrene resin combined, and from about 0.5 to about 5 parts by weight of lithium chloride per hundred parts by weight combined resins.

8. A thermoplastic polymer composition as defined by claim 7, comprising from about 20 to about 80 parts by weight of the polyphenylene ether resin and from about 20 to about 80 parts by weight of the styrene resin, per 100 parts by weight polyphenylene ether resin and styrene resin combined.

9. A thermoplastic polymer composition as defined by claim 1, further comprising a thermoplastic impact modifier.

10. A thermoplastic polymer composition as defined by claim 9, wherein the thermoplastic impact modifier is included in an amount sufficient to improve the impact strength of the composition.

11. A method as defined by claim 2, wherein lithium chloride is added in an amount of from about 0.5 to about 5 parts by weight per hundred parts by weight resins.

12. A method as defined by claim 2, wherein the styrene resin is a high impact polystyrene resin which comprises a polystyrene resin and an impact modifier.

* * * * *